Patented Jan. 5, 1937

2,066,363

UNITED STATES PATENT OFFICE 2,066,363

Gordon Derby Patterson, Wilmington, Del., assignor to E. I. du Pont de Nemours & Company, Wilmington, Del., a corporation of Delaware No Drawing. Application April 17, 1934, Serial No. 721,069

9 Claims. (Cl. 134—26)

This invention relates to coating compositions, and more particularly to improved paints which have as their vehicle a suitable modified polyhydric alcohol-polycarboxylic acid resin.

Exterior white paints, more particularly those containing a titanium pigment, are usually formulated with zinc oxide when a drying oil such as linseed is the vehicle. The zinc oxide is a valuable ingredient in these drying oil compositions because of the valuable properties conferred upon the film. In addition to increasing the rate of drying, hardening the film and preventing its early erosion by rapid chalking, zinc oxide also inhibits the growth of disfiguring black or colored mold. Zinc oxide, however, has some serious disadvantages when used as an ingredient of polyhydric alcohol-polycarboxylic acid resin films. For example, zinc oxide is generally harmful to polyhydric alcohol-polycarboxylic acid resin films because it lessens the distensibility and increases the tendency toward checking-cracking, and blister-peeling. In colored paints, the use of zinc oxide is also often objectionable on account of its high pigmentation properties and its consequent dilution of the desired color.

It is an object of this invention to produce new and useful pigmented compositions which have as their vehicles polyhydric alcohol-polycarboxylic acid resins. Another object is to produce coating compositions of this kind which are capable of yielding paint films especially resistant to the growth of black or colored mold, but having in addition the properties of improved flexibility retention and durability, a combination which is not obtainable when these resinous compositions contain adequately effective agents other than the compounds mentioned below for preventing objectionable mold growth. Other objects will appear hereinafter.

These objects are accomplished by the following invention which consists in incorporating organic compounds of mercury into pigmented coating compositions having selected pigment systems and suitably modified polyhydric alcohol-polycarboxylic acid resin vehicles.

I have discovered that when coating compositions are formulated as just indicated, and particularly when they contain titanium pigment and are substantially free from zinc oxide or other pigment or ingredient which detracts from the above described properties desired in the film, that the resulting films are highly resistant to mold growth and, as compared with those containing zinc oxide or like agents for resisting mold growth, are markedly improved in flexibility retention, resistance to checking-cracking, and the general durability properties most desired in films exposed to the weather.

With the above and other objects in view, which will be apparent as the description proceeds, I have set forth my invention in the following specification and have included the following examples of paint compositions embodying my invention by way of illustration and not as a limitation:

*Example I*

| | Parts |
|---|---|
| Barium base titanium pigment | 143.000 |
| Asbestine | 16.600 |
| Polyhydric alcohol-polycarboxylic acid resin A | 100.000 |
| Ethylmercuric arsenate | 0.519 |
| Drier solution (lead, manganese, cobalt linoleate) | 4.800 |
| Thinner | 75.000 |
| Total | 339.919 |

The ethylmercuric arsenate in this composition was used in an amount corresponding to 0.2% of the film solids. Growth of mold was entirely prevented during twenty months exposure (vertical-facing north). Even in amounts as low as 0.01% the development of mold growth was very slight. The comparison paint containing no agent developed a heavy, disfiguring growth of mold during this period. In this connection, it is to be kept in mind that the luxuriance of mold growth varies with the time of year and the weather conditions. During dry periods, the comparison paint is sometimes free of visible mold, but this desirable condition is not maintained. The tests just described included very severe mold growing conditions during which the remarkable resistance of the paint containing the mercurial was demonstrated.

*Example II*

The ethylmercuric arsenate of Example I is replaced by an equal amount of p-hydroxymercuri-o-chlorophenol, the formula being otherwise identical with Example I.

*Example III*

| | Parts |
|---|---|
| Barium base titanium pigment | 143.000 |
| Asbestine | 16.600 |
| Polyhydric alcohol-polycarboxylic acid resin A | 100.000 |
| Mercury oleate | 0.779 |
| Drier solution (lead, manganese, cobalt linoleate) | 4.800 |
| Thinner | 75.000 |
| Total | 340.179 |

The mercury oleate corresponds to 0.3% based on the film solids. Experience suggests 0.3% as an optimum quantity for maximum effectiveness with minimum agent.

The resin in the above compositions was prepared from the following ingredients by heating simultaneously at 200–275° C. until an acid number of 4–7 is obtained.

Resin A

| | Parts |
|---|---|
| Phthalic anhydride | 27.09 |
| Glycerol | 17.11 |
| Linseed oil acids | 55.80 |
| Total | 100.00 |

Example IV

| | Parts |
|---|---|
| Barium base titanium pigment | 153.900 |
| Antimony oxide | 17.100 |
| Polyhydric alcohol-polycarboxylic acid Resin B | 100.000 |
| p-Hydroxymercuri-o-chlorophenol | 1.355 |
| Drier solution (lead, manganese, cobalt oleates) | 4.000 |
| Thinner | 62.000 |
| Total | 338.355 |

The mercurial in the above example is used in an amount of 0.5% based on film solids. The resin in the above composition was prepared from the following ingredients by heating the glycerol and linseed oil until homogeneous, adding phthalic anhydride, and heating to resinification.

Resin B

| | Parts |
|---|---|
| Phthalic anhydride | 28.03 |
| Glycerol | 11.87 |
| Linseed oil | 60.10 |
| Total | 100.00 |

Example V

| | Parts |
|---|---|
| Titanium dioxide | 75.00 |
| Antimony oxide | 25.00 |
| Polyhydric alcohol-polycarboxylic acid Resin C | 100.00 |
| Mercuric salicylate | 2.00 |
| Drier solution (cobalt, manganese linoleates) | 3.40 |
| Thinner | 143.00 |
| Total | 348.40 |

The mercurial in the above example is used in an amount of 1.0% based on film solids. The resin in the above composition was prepared from the following ingredients by heating them together at 200° C. for 4 hours.

Resin C

| | Parts |
|---|---|
| Phthalic anhydride | 38.64 |
| Glycerol | 20.48 |
| Linseed oil acids | 27.54 |
| China-wood oil acids | 13.34 |
| Total | 100.00 |

Resins further illustrating those which may be used to advantage include:

Resin D

| | Parts |
|---|---|
| Phthalic anhydride | 14.51 |
| Glycerol | 13.43 |
| Linseed oil acids | 72.06 |
| Total | 100.00 |

Heat at 200–275° C. or to an acid number of 2.5.

Resin E

| | Parts |
|---|---|
| Phthalic anhydride | 27.24 |
| Glycerol | 16.30 |
| Linseed oil acids | 47.10 |
| China-wood oil | 9.36 |
| Total | 100.00 |

Heat at 200–250° C. or to an acid number 2.7.

Resin F

| | Parts |
|---|---|
| Phthalic anhydride | 27.24 |
| Glycerol | 16.30 |
| Linseed oil acids | 47.10 |
| Soya bean oil | 9.36 |
| Total | 100.00 |

Heat at 200–250° C. or to an acid number of 3—4.

The polyhydric alcohol-polycarboxylic acid resins referred to above may be made in any well known manner as, for example, by heating the ingredients at any suitable temperature above the melting point of the materials until resinification is complete. In the preparation of resins of unusually light color, it has been found preferable to carry out the reaction in the presence of an inert gas. If desired, refluxing or partial refluxing may be resorted to or the operation may be carried out at elevated or reduced pressures. Where oil is used in place of oil acids, it is desirable in order to obtain a homogeneous product, to heat the oil and glycerol together in the presence of an alcoholysis catalyst such as litharge before adding the phthalic anhydride. Other modifying ingredients, if used, may be added in either stage.

In carrying out the invention, there is added from .01 to 5.0% of the organic mercury compound to the mill base and the latter ground by any of the usual methods such as by ball mill, colloid mill, buhrstone, roller mill and the like. Where the mercury compound is already in finely divided form it can be added directly by efficient mixing or stirring either to the previously ground mill base, or to the finished paint or at any intermediate stage in the operation. It is often desirable to grind the mercury compound in part of the thinner in which event the addition can be made when desired. Or, it may be added as a powder, in the form of a suspension in water or in organic liquids, or in the form of solutions which by reaction in the paint medium yield the mercury compound in situ. Mercury compounds soluble in a suitable organic liquid may be added directly as solutions. When my improved resinous compositions are formulated with pigment the pigment may be treated with the organic mercury compound prior to incorporation into the coating composition vehicle. Where conditions are unusually severe, 0.3% or more of the more powerful organic mercury compounds may be used with advantage to insure exclusion of disfiguring mold growth, and in some cases it is desirable to use up to 0.5%. Certain of the less powerful but effective compounds are added in somewhat higher ratios, that is, from 0.5%–2.0%, or in exceptional cases even up to 5% based on film solids. In general, it is desirable to use compounds which are relatively non-volatile in order that they will not slowly volatilize from the film and thus reduce its effectiveness. It is usually desirable to employ compounds which are relatively insoluble in water, especially under the conditions where the films will be frequently exposed to wet weather. It is frequently desirable to employ compounds which are relatively soluble in oil; this insures a more uniform and effective distribution of the compound in the film. Also, in general, it is desirable to employ compounds which are of relatively low toxicity toward man, as for instance, phenylmercuric nitrate and phenylmercuric hydroxide. Usually, those organic compounds of mercury having a low solubility in alcohol are definitely less toxic toward man than those which are readily soluble.

Polyhydric alcohol-polycarboxylic acid resins of widely varying composition can be employed in carrying out my invention. The ingredients of the resins may be any of those conventionally used in the manufacture of polyhydric alcohol-polycarboxylic acid resins. Polycarboxylic acids other than phthalic acid or its anhydride may include such acids as succinic, adipic, sebacic, maleic, itaconic, tartaric, citric, dilactylic, thiodilactylic, salicylacetic, chlorophthalic, diphenic, pyromellitic, and naphthalic. Suitable polyhydric alcohols in addition to glycerol are ethylene glycol and higher homologs, diethylene glycol and other polyglycols, polyvinyl alcohol, polyglycerols, triethanolamine, pentaerythritol, and alkyl and aryl ethers of polyhydric alcohols, said ethers still having at least two hydroxyl groups, such as monobenzylin, and the diethyl ether of pentaerythritol. Other suitable resin ingredients, which may be termed modifying agents, are, broadly speaking, esters, monohydric alcohols, and monocarboxylic acids. Under the term "ester" as used should be included fatty oils such as linseed oil, cottonseed oil, castor oil, esters of natural acidic resins such as ester gum, Congo glycolide, and ethyl abietate; and other esters in general such as stearin, triacetin, butyl acetate, dibutyl tartrate, and ethyl benzoate. By the term "monocarboxylic acid" should be included pure monocarboxylic acids such as stearic, oleic, butyric, lactic, salicylic, and benzoic; fatty acid mixtures such as China-wood oil acids, cottonseed oil acids, soya bean oil acids, and coconut oil acids; and natural acidic resins such as rosin, kauri, and Congo. The polyhydric alcohol-polycarboxylic acid resins used in the preferred practice of my invention are the drying oil modified resins, namely, those chemically modified with drying oils or drying oil acids, with or without other modifying agents such as those mentioned above.

Compositions similar to those in the examples may be formulated with other organic compounds of mercury such as ethylmercuric chloride, ethylmercuric oleate, and ethylmercuric phosphate; acetoxymercuri-cresol, hydroxymercuri-paracresol, sodium ethylmercuri-thiosalicylate, 2-chloromercuri-3-nitrobenzoic acid, anhydro-orthohydroxymercuri-benzoic acid, p-hydroxymercuri-o-nitrophenol, mercuri sulfocyanate, mercuric benzoate, mercuric oxalate, mercurous oxalate, mercurous acetate, anhydro-hydroxymercuri-propionic acid, alpha-mercury dinaphthyl, mercuri-hydroxymercuri-acetic acid, mercuribis-biphenyl, mercury-betanaphtholate, mercury phenolate.

The organic portion of the organic mercury compound shall preferably be of such a nature that it does not serve as a food for the mold plant or otherwise encourage growth.

Among the compounds which are effective in amounts from 0.01% to 0.3% of the film solids are ethylmercuric arsenate, mercury oleate, and p-hydroxymercuri-o-chlorophenol; under normal circumstances it should never be necessary to use amounts greater than 0.5%. Among the compounds which are effective in somewhat higher concentrations, such as from 0.5% to 2.0% based on total film solids are: p-hydroxymercuri-o-nitrophenol, ethylmercuric oleate, ethylmercuric chloride, ethylmercuric phosphate, mercurous acetate, mercuric benzoate, mercuric salicylate, and the sodium salt of ethylmercuri-thiosalicylic acid. Under certain conditions, amounts as high as 5% may be advantageous in the case of less effective compounds. The term "effective", as used here and elsewhere in the present specification, indicates that the compound in question has prevented a disfiguring growth of mold.

The more effective of the mercury compounds named above, such as ethylmercuric arsenate and p-hydroxymercuri-o-chlorophenol are contained within the group having the general structure R—Hg—X where R represents a monovalent aliphatic hydrocarbon radical or a substituted phenyl group, and X is a hydroxyl group or an acid radical. In compounds of this type R—Hg—X, R may be an alkyl radical such as ethyl, butyl, dodecyl, decyl, crotyl, octadecyl, 9,10-octadecenyl, isoamyl; or, as indicated by the compounds mentioned in the examples, a nucleus-substituted phenyl group such as para-hydroxyphenyl, ortho-chlorophenyl, para-nitrophenyl, 3-chloro-4-hydroxyphenyl, 3-nitro-4-hydroxyphenyl, etc. X may be hydroxyl; an inorganic acid radical such as chloride, sulfate, arsenate, bromide, iodide, cyanide, nitrate, phosphate; an organic acid radical such as oleate, benzoate, salicylate, thiosalicylate, cyanate, thiocyanate, propionate, acetate, butyrate, decanoate, stearate, or alphanaphthionate.

As further examples of this general utility of the class of agents disclosed in this application, there may be mentioned the new mold-inhibiting organic mercurials of the formula aryl—Hg—X which are disclosed and claimed in co-pending application Serial No. 721,068, filed of even date herewith. The new inhibitors described in that application, which are highly effective in various kinds of compositions and of especial value in the kind of coating compositions disclosed herein, include compounds of the specific type R—Hg—X in which R is a monovalent aromatic hydrocarbon radical such as phenyl, o-, p-, or m-tolyl, xylyl, cumenyl, cymyl, p-ethylphenyl, 2-mesityl, alpha or beta naphthyl, p-benzylphenyl, p-phenylphenyl, etc.

In order to obtain the optimum results in flexibility retention and resistance to cracking, the resin vehicle and organic mercury compound described herein should be used in conjunction with an inert pigment such as titanium pigment exemplified by titanium oxide. The calcium or barium base titanium pigments are especially advantageous. In order to attain fully the objects of the invention the compositions should be free from zinc oxide and similar materials used to prevent disfiguring mold growth but which induce film embrittlement or otherwise adversely affect the properties of the film. When it is desirable to retard the rate of chalking, antimony trioxide is included and, if desired, inert extenders and colored pigments. Pigments other than the titanium pigment referred to in the examples are satisfactory for some purposes. Such pigments are lithopone, antimony oxide, chrome yellow, chrome green, Prussian blue, carbon black and other similar pigments as well as extender materials such as talc, whiting, barytes, silica, asbestine, china clay, and the like.

It will be seen that my invention resides not only in the discovery of highly effective agents for preventing disfiguring mold growth on pigmented polyhydric alcohol-polycarboxylic acid resin films but also in finding materials for this purpose which do not unfavorably affect the durability and flexibility retention of the paint film or otherwise injure paint properties. With the exception of the organic mercury compounds disclosed herein, I have found that the compounds suggested by the prior art for preventing disfiguring mold growth in drying oil paint films either were ineffective when used in polyhydric alcohol-polycarboxylic acid resin paints in practical amounts, or if effective they cannot be used satisfactorily in these resin paints because they unfavorably affect the durability and flexibility retention of the film, induce yellowing or deleteriously affect the film in some other way. Thus, zinc oxide, which is a widely used agent for preventing mold growth, produces such a reduction in flexibility retention and durability in the films from my resin compositions that its use is precluded unless valuable film properties are sacrificed. After six months outside exposure, tests of a titanium paint having the resin vehicle of Example I and containing zinc oxide in amount sufficient to prevent disfiguring mold show that it was capable of only 0.5% elongation whereas the same paint without the zinc oxide but containing 0.2% p-hydroxy mercuri-o-chloro-phenol (i. e. the paint of Example II) showed 26% elongation and was free of disfiguring mold growth. Cadmium hydroxide, in amount sufficient to prevent disfiguring mold, produces a paint film capable of less than 10% elongation.

On the other hand, most of the compounds known to be useful in preventing disfiguring mold growth in conventional paints are, as mentioned above, unsatisfactory for this purpose in polyhydric alcohol-polycarboxylic acid resin paints. For instance, such compounds as sodium fluoride, zinc chloride, mercurous chloride, mercuric chloride, and mercuric sulfate are described in the prior art as effective for preventing mold growth on paint films but are of little or no use for preventing mold growth in the resin paints disclosed herein. The following table shows the results obtained when various compounds used in formulating prior art coating compositions are used in the polyhydric alcohol-polycarboxylic acid paints disclosed herein:

| Compounds | % of compound based on film solids | Mold grading | |
|---|---|---|---|
| | | Lab. test 7 days | 14 months Florida—Exposure |
| Sodium fluoride | 1.24 | Slight | Considerable |
| Mercurous chloride | 0.62 | Slight | Considerable |
| Mercuric chloride | 0.31 | Absent | Considerable+ |
| Mercuric sulfate | 1.24 | Absent | Considerable |
| Zinc chloride | 1.24 | Considerable | |
| Ethylmercuric arsenate | .2 | Absent | Slight |
| Control paint | | Bad | Bad |

A large number of agents reported to inhibit mold in fields other than paint have likewise been tested by exposing to the weather films of resin composition similar to Example I for 16 to 17 months, and it has been found that the films all exhibited mold growth. Heavy mold growth was found on the films containing the following: p-nitrophenol, phenol, p-chlorophenol, o-chlorophenol, b-naphthol, thymol, o-hydroxydiphenyl, boric acid, benzoic acid, salicylic acid, lactic acid, zinc fluoride, borax, cadmium chloride, sodium fluosilicate, disodium phosphate. Films containing the following agents showed various degrees of mold growth: mercuric arsenate, salicyl anilide, 2,4,6-trichlorophenol, zinc benzoate, zinc salicylate, copper acetate, copper carbonate. The following table, similar to the one above, shows the mold grading of paints of the kind given in the examples when mold inhibiting agents are used which are stated to be effective in fields other than paints:

| Compounds | % of compound based on film solids | Mold grading | |
|---|---|---|---|
| | | Lab. test 7 days | 14 months Florida—Exposure |
| Phenol | 1.24 | Bad | Bad |
| Nicotine | 0.31 | Bad | Bad |
| Orthohydroxydiphenyl | 0.31 | Considerable | Bad |
| Zinc cyanide | 1.5 | Absent | Bad |
| Zinc arsenate | 0.31 | Considerable | Bad |
| 2,4,6-trichlorophenol | 1.24 | Slight | Considerable |
| Sodium fluosilicate | 1.24 | Considerable | Bad |

"Slight" in the foregoing tables means a small amount of mold visible possibly to the naked eye—not disfiguring. "Considerable" refers to visible to the naked eye, covering the entire panel generally and definitely disfiguring the panel. "Bad" means a marked increase in the amount of mold indicated by "considerable".

Films of paints formulated exactly as in Example I but containing the following agents in reasonable amounts also exhibited objectionable degrees of mold growth: sodium phenate, cresol, p-chloro-m-cresol, dinitrophenol, tribromphenol, methyl-p-hydroxybenzoate, pyromucic acid, lead arsenate, zinc resinate, and sodium benzoate.

Other important advantages of the mold resisting resinous compositions disclosed herein are their freedom from any harmful effects on properties such as drying time, whiteness or color, or gloss. The properties in the paint films disclosed herein are generally affected adversely by compounds proposed heretofore for the prevention of mold. Thus, the agents reported effective in other coating composition systems, which are also effective with polyhydric alcohol-polycarboxylic acid resin compositions, detract in some undesirable way from the film properties. A great many of the agents previously reported effective in other systems are not only ineffective with polyhydric alcohol-polycarboxylic acid resins but, in addition, unfavorably affect such properties as flexibility, drying time, color, or gloss.

It will be apparent from the foregoing that I have produced new pigmented polyhydric alcohol-polycarboxylic acid resin coating compositions which are resistant to mold growth and which at the same time have to an exceptionally high degree the valuable properties of flexibility retention, resistance to checking and cracking, good appearance, and in general excellent durability.

As many apparently widely different embodiments of this invention may be made without departing from the spirit and scope thereof, it is to be understood that I do not limit myself to the specific embodiments thereof except as defined in the appended claims.

I claim:

1. A coating composition comprising a resin of the class consisting of fatty oil and fatty oil acid modified polyhydric alcohol-polycarboxylic acid resin and an organic compound of mercury, in amount sufficient to prevent disfiguring mold growth on the film, said composition yielding films which possess upon exposure the durability and flexibility of films from similar compostions containing said resins but containing no mold inhibiting substance.

2. A coating composition comprising a drying oil modified polyhydric alcohol-polycarboxylic acid resin, a pigment, and an organic compound of mercury, in amount sufficient to prevent disfiguring mold growth on the film, said composition yielding films which possess upon exposure the durability and flexibility of films from similar compositions containing said resins but containing no mold inhibiting substance.

3. A coating composition comprising a drying oil modified polyhydric alcohol-polycarboxylic acid resin, a titanium pigment, and an organic compound of mercury, in amount sufficient to prevent disfiguring mold growth on the film, said composition yielding films which possess upon exposure the durability and flexibility of films from similar compositions containing said resins but containing no mold inhibiting substance.

4. A coating composition comprising a drying oil modified polyhydric alcohol-polycarboxylic acid resin, a pigment system free of material which prevents mold but causes film embrittlement, and an organic compound of mercury, in amount sufficient to prevent disfiguring mold growth on the film, said composition yielding films which possess upon exposure the durability and flexibility of films from similar compositions containing said resins but containing no mold inhibiting substance.

5. A zinc-free coating composition comprising a drying oil modified polyhydric alcohol-polycarboxylic acid resin, a pigment, and an organic compound of mercury, in amount sufficient to prevent disfiguring mold growth on the film, said composition yielding films which possess upon exposure the durability and flexibility of films from similar compositions containing said resins but containing no mold inhibiting substance.

6. A coating composition comprising a drying oil modified polyhydric alcohol-polycarboxylic acid resin, a zinc-free pigment system containing titanium, and an organic compound of mercury, in amount sufficient to prevent disfiguring mold growth on the film, said composition yielding films which possess upon exposure the durability and flexibility of films from similar compositions containing said resins but containing no mold inhibiting substance.

7. A coating composition comprising a drying oil modified polyhydric alcohol-polycarboxylic acid resin, a zinc-free pigment system containing titanium and an extender, and an organic compound of mercury, in amount sufficient to prevent disfiguring mold growth on the film, said composition yielding films which possess upon exposure the durability and flexibility of films from similar compositions containing said resins but containing no mold inhibiting substance.

8. A coating composition comprising a drying oil modified polyhydric alcohol-polycarboxylic acid resin, a zinc-free pigment system containing antimony and titanium, and an organic compound of mercury, in amount sufficient to prevent disfiguring mold growth on the film, said composition yielding films which possess upon exposure the durability and flexibility of films from similar compositions containing said resins but containing no mold inhibiting substance.

9. A coating composition comprising a drying oil modified polyhydric alcohol-polycarboxylic acid resin, a zinc-free pigment system containing titanium, antimony, and an extender, and an organic compound of mercury, in amount sufficient to prevent disfiguring mold growth on the film, said composition yielding films which possess upon exposure the durability and flexibility of films from similar compositions containing said resins but containing no mold inhibiting substance.

GORDON DERBY PATTERSON.